United States Patent [19]
Van Huisen

[11] 3,805,885
[45] Apr. 23, 1974

[54] EARTH HEAT ENERGY DISPLACEMENT AND RECOVERY SYSTEM

[76] Inventor: Allen T. Van Huisen, 29456 Indian Valley Rd., Grand Rapids, Mich. 90274

[22] Filed: June 18, 1970

[21] Appl. No.: 47,228

[52] U.S. Cl. .................................. 165/45, 166/11
[51] Int. Cl. ................................................ F28d 15/00
[58] Field of Search ............ 165/45; 62/260; 60/26; 166/272, 305, 306, 305 D, 302, 3; 61/35, 36; 159/1 G

[56] References Cited
UNITED STATES PATENTS

| | | | |
|---|---|---|---|
| 3,353,602 | 11/1967 | Geertsma | 166/306 X |
| 2,028,471 | 1/1936 | Parent et al. | 165/45 X |
| 2,554,661 | 5/1951 | Clancy | 165/45 |
| 3,274,769 | 9/1966 | Reynolds | 165/45 X |
| 3,294,167 | 12/1966 | Vogel | 166/11 |
| 3,470,943 | 10/1969 | Van Huisen | 60/26 X |

Primary Examiner—Charles J. Myhre
Assistant Examiner—Theophil W. Streule, Jr.
Attorney, Agent, or Firm—Marvin E. Jacobs

[57] ABSTRACT

Recovering heat and/or distilled products from a relatively shallow porous stratum beneath the surface of the earth, the shallow stratum having previously been flooded with heat from a deeper earth stratum through a geothermal well is disclosed. In one embodiment, fluidized wastes, such as sewage, are injected into the upper stratum and distilled vapor is recovered from the upper stratum for recycle or use. In another embodiment, space heating of buildings and the like is provided by heat exchanging heated fluid with the upper stratum and circulating the heated fluid throughout the buildings.

13 Claims, 4 Drawing Figures

INVENTOR
ALLEN T. VAN HUISEN

BY *John E. McGang*

ATTORNEY

INVENTOR
ALLEN T. VAN HUISEN
BY John E. McGarry
ATTORNEY

EARTH HEAT ENERGY DISPLACEMENT AND RECOVERY SYSTEM

This invention relates to the recovery of heat energy from the earth. In one of its aspects the invention relates to the use of geothermal energy in the disposal of liquid wastes. In another of its aspects, the invention relates to the use of geothermal energy in space heating.

It is well known that the core of the earth contains a vast storehouse of heat energy. While it was originally believed that the earth was gradually cooling, it is now believed that the core of the earth is actually becoming warmer. In some areas the presence of geological faults brings the heat closer to the surface of the earth. In some cases, geothermal steam may actually occur at the surface of the earth.

At these areas of shallow geothermal energy, geothermal steam has been used to produce power, and in some cases to heat houses. Heretofore, it has been held that most of the geothermal heat lies too far beneath the surface of the earth to permit economic recovery for common uses such as space heating of buildings and other uses wherein lower temperatures than those useful for power generation are employed.

By various aspects of this invention, one or more of the following, or other, objects can be obtained.

It is an object of this invention to provide a system and method for economic recovery of geothermal energy for lower temperature requirements.

It is a further object of this invention to provide a system and method for disposal of liquid-containing wastes wherein the liquid in the wastes is recovered.

It is another object of this invention to provide a system and method for use of geothermal energy in the disposal of liquid wastes.

It is another object of this invention to provide a system and method for use of geothermal energy in space heating of buildings and the like.

It is yet another object of this invention to provide a system and method of using a single geothermal well to supply whole communities with heat.

It is yet another object of this invention to provide a pollution free heating system and method.

A further object of this invention is to provide an economic system and method for recycling liquid wastes so as to reduce pollution of streams, rivers, and lakes.

It is yet another object of this invention to materially reduce water and air pollution by providing a system and method whereby air pollution from heating plants is eliminated and whereby water pollution from liquid waste disposal is eliminated.

Other aspects, objects, and the several advantages of this invention are apparent to one skilled in the art from a study of this disclosure, the drawings, and the appended claims.

Briefly, according to the invention, a relatively shallow stratum within the earth is flooded with heat energy from a geothermal zone much deeper within the earth's crust. The shallow stratum is used as a storage zone for the heat and is brought to a uniform temperature over a wide area. When a desired temperature is reached, the heat energy is tapped for industrial use such as distillation of liquid wastes and/or for heat sources for commercial and residential buildings and the like. Desirably, separate wells are drilled into the strata for these purposes. In one embodiment, a disposal well is drilled for injection of liquid containing wastes or slurries into the formation and a vapor recovery well is provided to recover the distilled vapors from the wastes or slurries. One such liquid containing waste is sewage which is injected into the heated stratum, the water in the slurry is distilled and recovered for recycle or other use. The decomposition of the waste is hastened by the heat in the shallow stratum.

In another embodiment, a well is drilled into the stratum for withdrawing heat through a heat exchange means for use in a circulating fluid heat system.

The invention will now be described with reference to the accompanying drawings in which.

Figure 1:
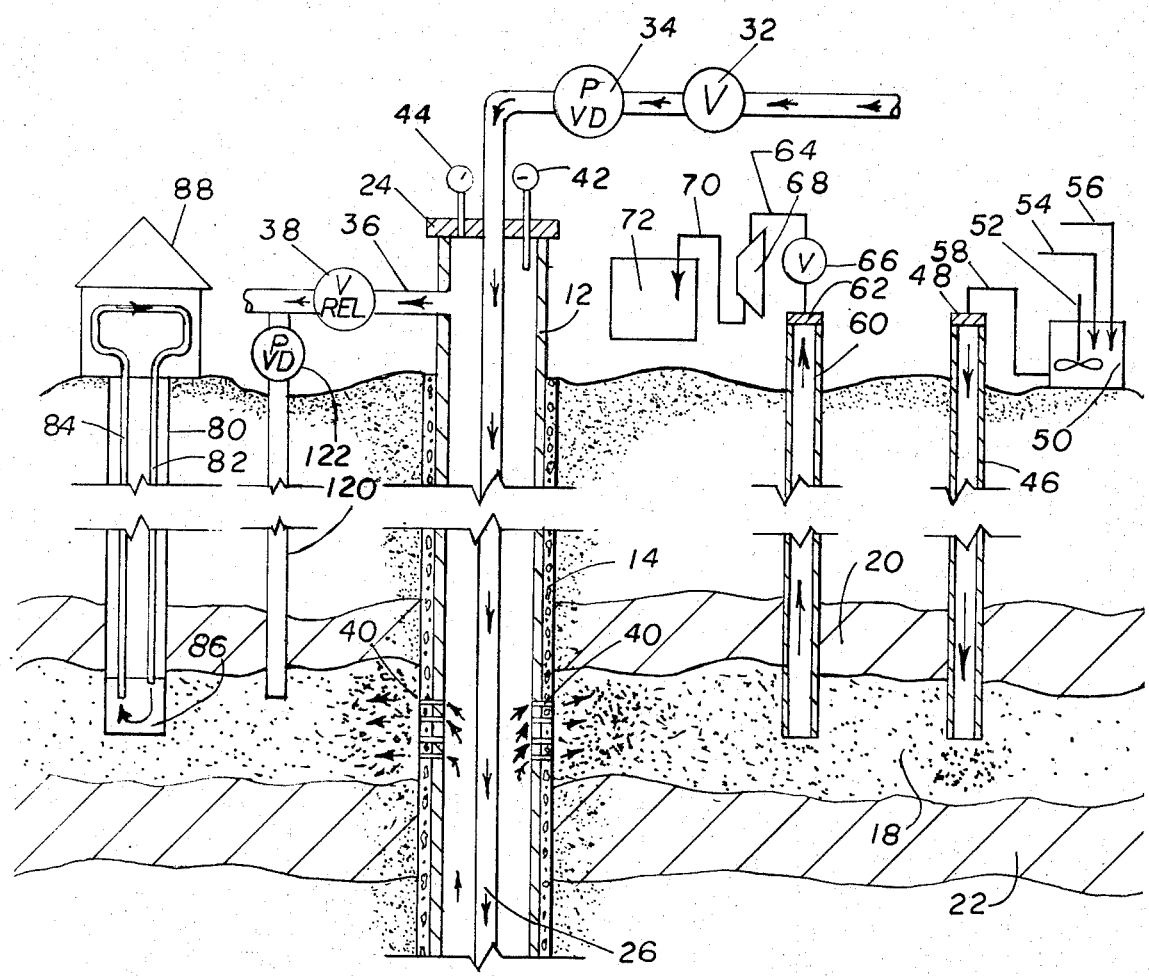
FIG. 1 represents a cross section through the earth schematically illustrating an embodiment of the invention.
Figure 1:
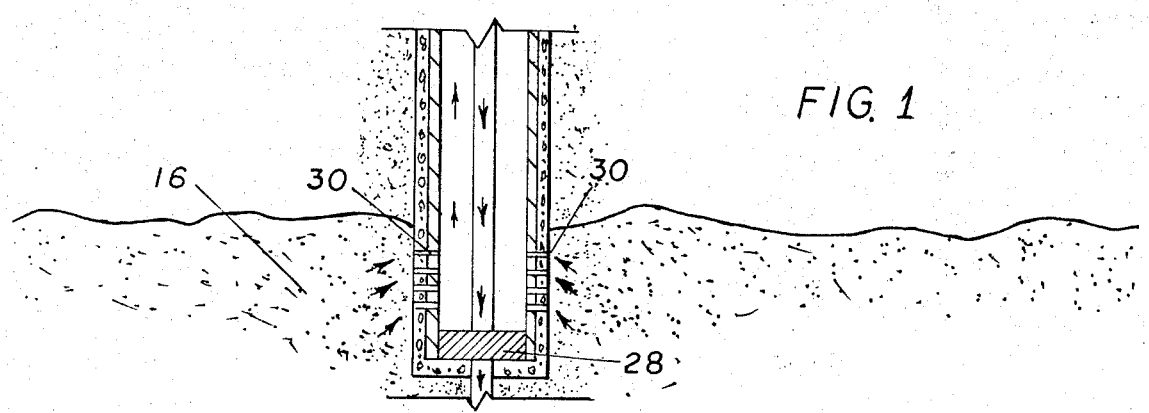

Referring now the the drawings, and to FIG. 1 in particular, there is shown a cross sectional view through a portion of the earth in which a metal well casing 12 extends from above the surface of the earth downwardly into a geothermal zone 16. The well casing is surrounded by a concrete layer 14 which engages the exterior of the metal casing 12. The well casing 12 also extends through a porous stratum 18 comprised of sand, sandstone or limestone. On either side of the porous stratum 18 are impermeable shale strata 20 and 22.

The well casing 12 has a cap 24 at the top portion and a plug 28 at the bottom portion to seal the interior of the well casing. A fluid injection pipe 26 extends through the well cap 24 at the top of the casing and through the plug 28 at the bottom of the casing. The fluid injection pipe is connected to a source of fluid (not shown) and extends at the bottom portion substantially beneath the plug 28. A plurality of perforations 30 are provided in the bottom of the well casing 12 and in the bottom of the concrete layer 14 to communicate the interior of the well casing 12 with the geothermal strata 16. The fluid injection pipe 26 has a valve 32 and a variable delivery pump 34 to control the volume and pressure of water injected into the geothermal strata 16.

A fluid withdrawal pipe 36 having a relief valve 38 is provided at the top of the well casing 12 to remove fluids from the top portion of the well casing. A temperature sensing gauge 42 and pressure sensing gauge 44 are provided at the top of the well to indicate the temperature and pressure within the well casing 12.

Perforations 40 are provided in the well casing 12 and in the concrete layer 14 to provide communication between the interior of the well casing 12 and the porous strata 18.

Figure 2:
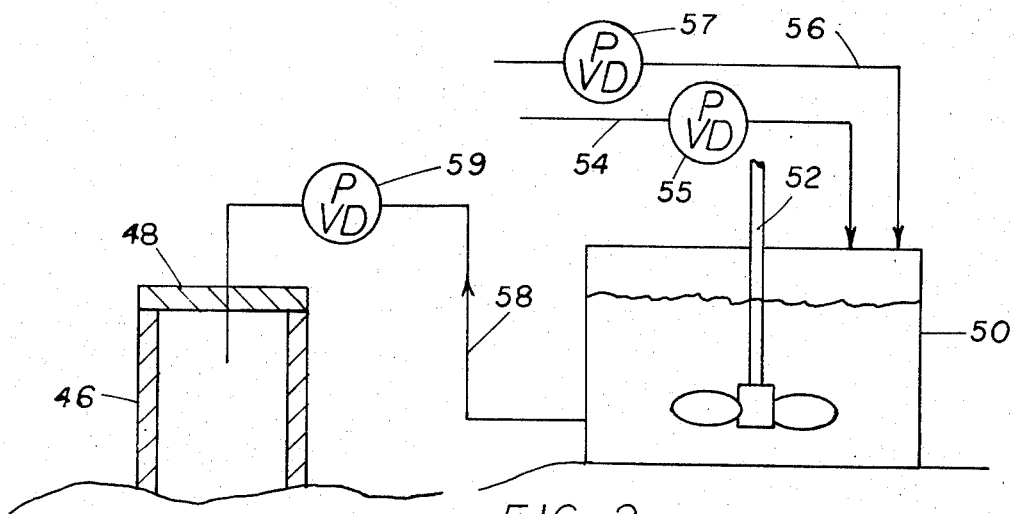
FIG. 2 is an enlarged view of a portion of the system illustrated in FIG. 1.
Figure 3:
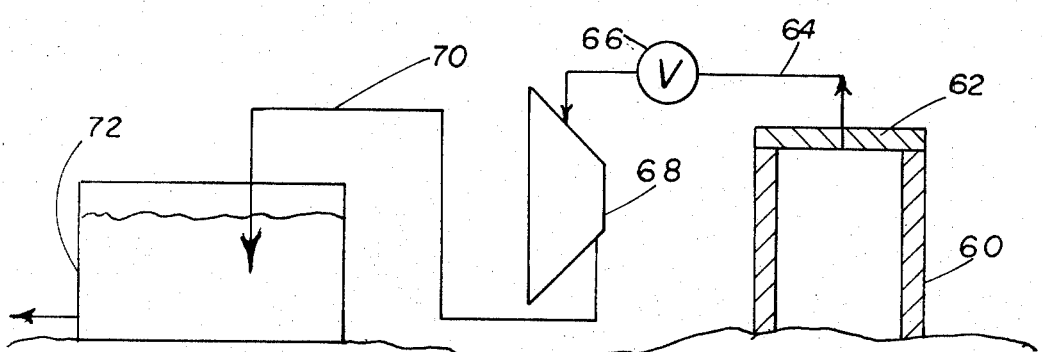
FIG. 3 is an enlarged view of another portion of the system shown in FIG. 1.

According to the invention, and with reference to FIGS. 1, 2 and 3, a sewage injection well is drilled into the earth into the porous strata 18. A metal well casing 46 of conventional nature is provided to communicate the porous strata 18 with the surface of the earth. A cap 48 seals the top of the well casing 46. A mixing tank 50 having an agitator 52 is supplied with sewage through line 54 and water through line 56. As seen in FIG. 2, line 56 has a variable delivery pump 57 and line 54 has a variable delivery pump 55. Various controls (not shown) can be provided to vary the amounts and proportions of water and sewage entering the mixing tank 50. The combined water and sewage is pumped from tank 50 through line 58 by a variable delivery pump 59 into the well casing 46 and down into the porous strata 18.

A producing well, spaced from the sewage injection well, is drilled from the surface of the earth into the porous stratum 18. A metal well casing 60 communicates the porous stratum 18 with the surface of the earth. The well casing 60 has a cap 62 to seal the interior of the well casing. As seen in FIG. 3, a production line 64 extends through cap 62 to withdraw fluid, such as steam from the top of the well casing 60. A valve 66 in line 64 controls the pressure of the steam in line 64 which is supplied to a generator 68. The steam is condensed in the generator 68 which can be used for the production of power, and the condensate is passed through line 70 into a surge tank 72. The water, thus recovered, can be used for any suitable purpose such as drinking, or it can be returned to natural streams or even used for recycle of the sewage. Since the water is distilled, it is safe for drinking or any other purpose.

Figure 4:
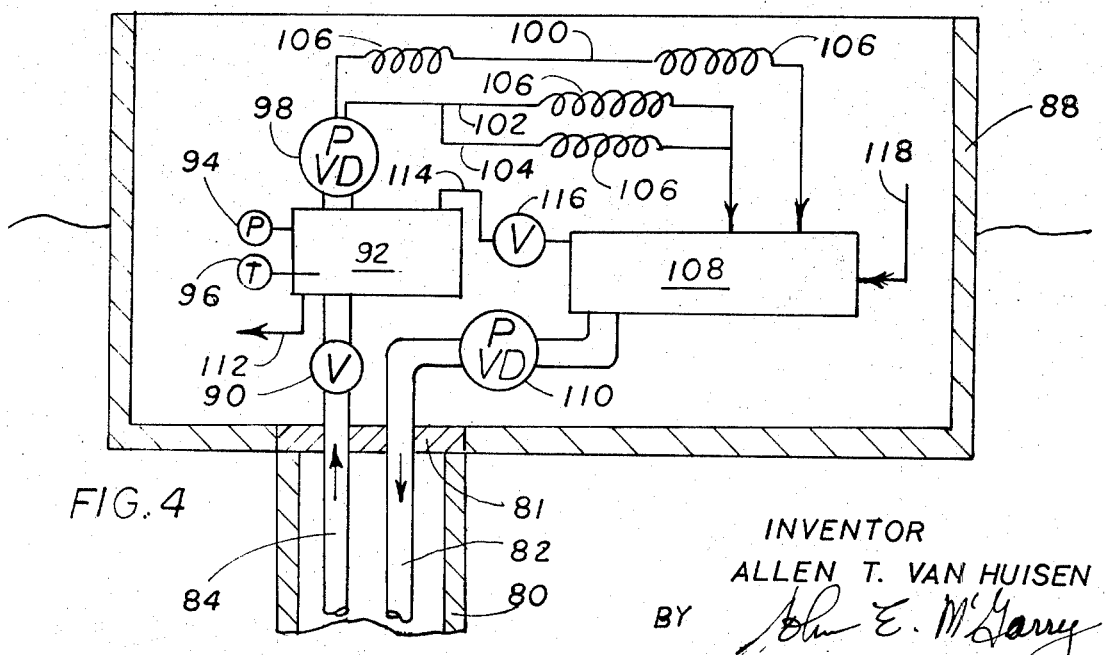
FIG. 4 is an enlarged view of still another portion of the system schematically illustrated in FIG. 1.

Reference is now made to FIGS. 1 and 4 for a description of a heating system employed in the invention. A well is drilled between a dwelling structure 88 at the surface of the earth and the porous stratum 18. A metal well casing 80 is provided to communicate the bottom of the structure 88 with the porous stratum 18. A cap 81 seals the top of the casing. A fluid supply line 82 extends through the cap 81 and supplies fluid, such as water, to a heat exchanger 86 at the bottom of the casing 80 within the porous stratum 18. The heat exchanger is preferably closed. Various types of heat exchanger which can be used are disclosed in U.S. Pat. No. 3,470,943, which is incorporated herein by reference. A fluid return line 84 extends from the heat exchanger 85 within the casing 80 through the cap 81 and supplies heated water to a surge tank 92. A valve 90 is provided in the line to control the flow of heated water to the surge tank 92. A pressure gauge 94 and a temperature gauge 96 are provided on the tank 92 to indicate the pressure and temperature within the surge tank 92. A plurality of heating lines 100, 102 and 104 communicate through a variable delivery pump 98, the surge tank 92 with a plurality of heating coils 106 and with a holding tank 108. The fluid supply line 82 communicates with the bottom of the holding tank 108 through pump 110. A hot water line 112 communicates with the interior of surge tank 92 to withdraw hot water from the surge tank 92.

A bypass line 114 having a valve 116 is provided between the surge tank 92 and the holding tank 108. A water input line 118 communicates at one end with a water source (not shown) and the holding tank 108.

The depth of the porous stratum 18 will depend on geological conditions. The depth of the porous stratum will generally be less than about 3,000 feet and can be as shallow as 60 feet below the surface of the earth. Preferably, the depth of the stratum will be less than 300 feet. The stratum should be porous, free from faults within the heated area, and insulated by a hard crust of shale, for example, at least on its upper side. The location of the stratum 18 will desirably be as close to the surface of the earth as possible.

In operation, the geothermal well is drilled into a suitable geothermal zone. Such zones may be as deep as 15 to 20 thousand feet below the surface of the earth, or may be as shallow as 3 to 5,000 feet in the case of some shallow geothermal fault areas. The temperature in the geothermal zones will preferably be in the range of 500° — 1,000°F although lower and higher temperatures can be used. The geothermal well will be drilled sufficiently deep to reach these temperatures.

The heat is transferred from the geothermal zone to the porous stratum 18 by circulating water from the fluid injecting pipe 16 through the geothermal zone, upwardly through the casing 12 and into the porous stratum 18. The water will be heated in the geothermal zone 16 and vaporized to provide superheated steam which enters the casing 12 through perforations 30. The steam rises in the casing 12 and fills the entire casing. The pressure within the casing 12 is increased so that the steam is forced into the porous stratum 18 through perforations 40. The steam is allowed to penetrate the porous stratum 18 until the temperature of the stratum is preferably at least about 300° F. The pressure of the steam within the stratum will be elevated and this pressure will be registered by the pressure sensing means 44. If desirable, a plurality of geothermal wells can be employed to heat wide areas of the same stratum to provide a uniform temperature over many miles beneath the surface of the earth. For example, a stratum between a large city or beneath whole communities can be provided while one shallow, uniformly heated stratum. Conceivably two to three years of heating may be required before the entire stratum is uniformly heated to the proper temperature.

Other systems for transferring heat to the porous strata can be provided. Examples of other transfer systems are disclosed and claimed in my copending Ser. No. 868,395 Filed Oct. 22, 1969 now U.S. Pat. No. 3,679,264 granted July 25, 1972 entitled "Geothermal Insitu Mining and Retorting System."

It may be desirable to increase the rate at which the stratum 18 is heated. To this end a steam injection well comprised of a conventional metal casing 120 can be provided adjacent to the geothermal well. The upper portion of the well casing 120 communicates with the fluid withdrawal pipe 36 and the lower portion of well casing 120 communicates with the porous stratum 18. A pump 122 in the upper portion of casing 120 forces the steam into the upper stratum 18 under high pressure.

When the stratum 18 has been uniformly heated, a plurality of wells can be drilled into the stratum 18 to recover the heat energy therein. For example, a plurality of heat producing wells can be drilled from the surface of the earth into the porous stratum 18 a spaced distance from the geothermal well. Since the stratum is uniformly heated, each point in the stratum 18 has the same heat producing capabilities. Thus, each commercial building and dwelling structure within a community could use the stratum 18 as a source of heat energy.

Heat is produced for each dwelling structure by circulating a fluid, such as water, through the well casing 80 and heat exchanging the fluid with the heated porous stratum 18. In the embodiment shown in the drawings, water is circulated down through the fluid supply line 82, through heat exchanger 86, and heated water, preferably less than steam temperatures, is withdrawn through the return line 84. The heated water is circulated through the space heating system by regulating the pump 98, or the heated water can bypass the space heating system to the holding tank 108 through line 114.

It is contemplated that the enormous heating requirements of entire communities may draw more heat from the stratum than can be replaced during peak heating times, and that the heat requirements during one heating season may deplete the heat content of the porous stratum 18. However, during the dormant heating periods, such as warmer days, and during the summer months, the stratum 18 can be reheated to the optimum heating temperatures required for seasonal use. Thus, the heat content of the stratum 18 may fluctuate, but over extended periods of time it will maintain a constant value.

The operation of the sewage or water disposal system will now be described. The porosity of the stratum 18 will be known from geological data. In some cases, it will be desirable to use deplete oil sands about which great amounts of geological data have been collected. The sewage or liquid wastes can thus be diluted and mixed sufficiently for optimum injection rates into the porous stratum 18. The sewage, properly diluted, is injected into the porous stratum at the high injection rates. The heat of the stratum 18 vaporizes the water or other liquid in the wastes, thus leaving the disolved impurities and solids within the stratum 18. In the case of sewage, the impurities will be left within the stratum. However, the heat within the stratum aids and hastens the decomposition of the wastes to permit recovery thereof at a later time. The steam or other vaporized liquid is removed through a producing well defined by a well casing 60. In actual production, a plurality of such producing wells can be employed to maintain a high rate of sewage injection into the porous stratum 18.

The heated water recovered from the well casing 60 can be used for many diverse purposes such as space heating, frost free roads, and heat irrigation. If used for space heating, the well output would communicate with a space heating plant which uses heated liquids, an example of such heating plant being illustrated schematically in FIG. 4.

The invention also contemplates the disposal of organic or other types of chemical waste materials. Conceivably, the porous stratum 18 will contain catalytic material, which, with the heat of the formation, will catalytically assist in the break down of the liquid wastes. The decomposition products, thus vaporized, can be removed from the producing wells and used for other purposes.

In other cases, thermal wastes, such as from nuclear power generating plants, can be injected into the heated stratum for conservation of heat energy. At present, heated water from the nuclear generating plants is cooled and discarded with the heat lost to the atmosphere. By this invention, the heat from the water can be conserved by injecting the heated water into the porous stratum through a well casing 60, for example. The heated water from the nuclear plants can supplement and in some cases be in lieu of the heat from the geothermal zone.

In order to prevent saturation of the porous stratum 18, water producing wells can be drilled at the edge of the stratum. The water removed therefrom can be reinjected into the geothermal zone through fluid injection pipe 26.

Reasonable variation and modification are possible within the scope of the foregoing disclosure, the drawings, and the appended claims without departing from the spirit of the invention.

The embodiments of the invention in which an exclusive property or privilege is claimed are defined as follows.

1. A geothermal energy displacement system for recovery and utilization of geothermal energy comprising in combination:

a geological formation including a relatively shallow, porous stratum overlying a lower, geothermal zone having a high temperature;

means for injecting heated fluid into said stratum comprising a first well bore extending from the surface of the earth and through said stratum into said lower zone; a metal casing lining said bore containing a cap at a first end above said surface and a sealing plug received within the lower end of the casing within said zone and containing a first series of perforations above said plug and within said zone and a second series of perforations within the portion of the casing traversing the stratum; a fluid injection pipe disposed within said casing and having a first upper end extending through said cap and a second lower end extending sealingly through said plug and into said zone below said plug; a source of liquid; pump means for pumping said liquid from said source into the first end of said pipe and through said second end and into said zone to form a body of pressurized, heated fluid within said zone for entering said casing through said first series of perforations and for injecting said pressurized, heated fluid into said stratum through said second series of perforations to flood said stratum with sufficient quantity of said heated fluid to substantially and uniformly heat said stratum over a wide area surrounding said first well bore; and at least one heat producing well extending from the surface of the earth into said heat flooded stratum including a bore, a metal casing lining said bore having a closed, lower end disposed in said stratum, heat exchange means disposed within said casing within said stratum, means within said casing for conducting heat exchange fluid from the surface of the earth to the heat exchanger and means within said casing for conducting heated fluid from said heat exchanger to the surface to provide a source of heated fluid for heating dwellings and the like.

2. A system according to claim 1 wherein the casing of said heat producing well is closed at its lower end and said lower end of said casing forms said heat exchange means.

3. A space heating system according to claim 2 wherein, said heat exchange means is closed and said fluid conducting means includes a first conduit extending from the surface of the earth into said heat exchange means, a pump means in said first conduit to pass fluid through said first conduit into said heat exchange means; and a second conduit extending from the surface of the earth to said heat exchange means to pass heated fluid from said heat exchange means to the surface of the earth.

4. A system according to claim 1 in which said stratum is disposed between impermeable strata.

5. A system according to claim 4 in which the stratum is from 60 to 3,000 feet below the surface of the earth.

6. A system according to claim 1 in which the stratum is no more than 300 feet below the surface of the earth and is selected from the group consisting of sandstone, limestone and sand.

7. A system according to claim 6 in which the zone is from 3,000 to 5,000 feet below the surface of the earth and has a temperature from 500°F to 1,000°F.

8. A method of recycling chemical and organic containing liquid wastes having high temperature decomposition properties, said method comprising:
injecting said liquid wastes into a porous stratum beneath the surface of the earth;
transferring heat from a dry, hotter geothermal zone substantially below said porous stratum up into said porous stratum in sufficient quantites to maintain said porous stratum at sufficient temperatures to decompose said liquid wastes into usable decomposition products by drilling a well through said stratum into said zone, lining said well, perforating said lining within said zone and within said stratum, injecting liquid through said well into said zone, heating the liquid within said zone and transferring the heated liquid through said perforations into said stratum and flooding said stratum with said heated liquid; and
recovering the decomposition products from said porous stratum.

9. A method of recycling liquid wastes according to claim 8 wherein said porous stratum contains a catalyst which aids in the decomposition of said liquid wastes.

10. A method of displacing and recovering geothermal energy comprising the steps of:
drilling a well bore through a geological formation including a relatively shallow porous stratum and an underlying, hotter, geothermal zone;
lining the well bore with a metal casing;
capping and plugging the casing;
perforating the casing within said zone and within said stratum;
injecting liquid through said casing and plug deep into said zone to heat said liquid within said zone;
transferring said liquid through said perforations within the zone into the casing and through the perforations within the stratum into the stratum in sufficient quantity to flood the stratum with the liquid throughout an extended area surrounding the casing and substantially uniformly heat the stratum to an elevated temperature;
inserting a closed heat exchanger into the flooded stratum;
delivering cold heat exchange liquid to the heat exchanger and indirectly exchanging heat from said flooded stratum to said heat exchange liquid through the walls of the heat exchanger to form a source of hot, heat exchange liquid; and
removing the hot heat exchange liquid from the heat exchanger to the surface for heating dwellings and the like.

11. A method according to claim 10 in which said liquid and heat exchange liquid are water.

12. A method according to claim 10 in which said stratum is no more than 300 feet below the surface of the earth, said zone is from 3,000 to 20,000 feet below the surface of the earth and said zone has a temperature of from 500°F to 1000°F.

13. A method according to claim 10 further including the steps of injecting organic or chemical containing liquid wastes into said flooded stratum; thermally decomposing the wastes within the stratum and recovering the gaseous decomposition products thereof from the stratum.

* * * * *

UNITED STATES PATENT OFFICE
CERTIFICATE OF CORRECTION

Patent No. 3,805,885                    Dated April 23, 1974

Inventor(s) Allen T. Van Huisen

It is certified that error appears in the above-identified patent and that said Letters Patent are hereby corrected as shown below:

Title page, in number [76], inventor's name and address should read --Allen T. Van Huisen, 29456 Indian Valley Road, Rolling Hills Estates, California 90274--   Column 2, line 61, "strata" should read --stratum--; line 63, "strata" should read --stratum--.  Column 3, line 6, "strata" should read --stratum--.  Column 4, line 30, delete "provided while" and insert --heat flooded to provide--.

Signed and sealed this 24th day of September 1974.

(SEAL)
Attest:

McCOY M. GIBSON JR.                    C. MARSHALL DANN
Attesting Officer                       Commissioner of Patents